Sept. 23, 1969     M. W. DICKOVER ET AL     3,468,721
MOSS SHIELD AND SEPARATOR-PROTECTOR ASSEMBLY
Filed Oct. 27, 1967
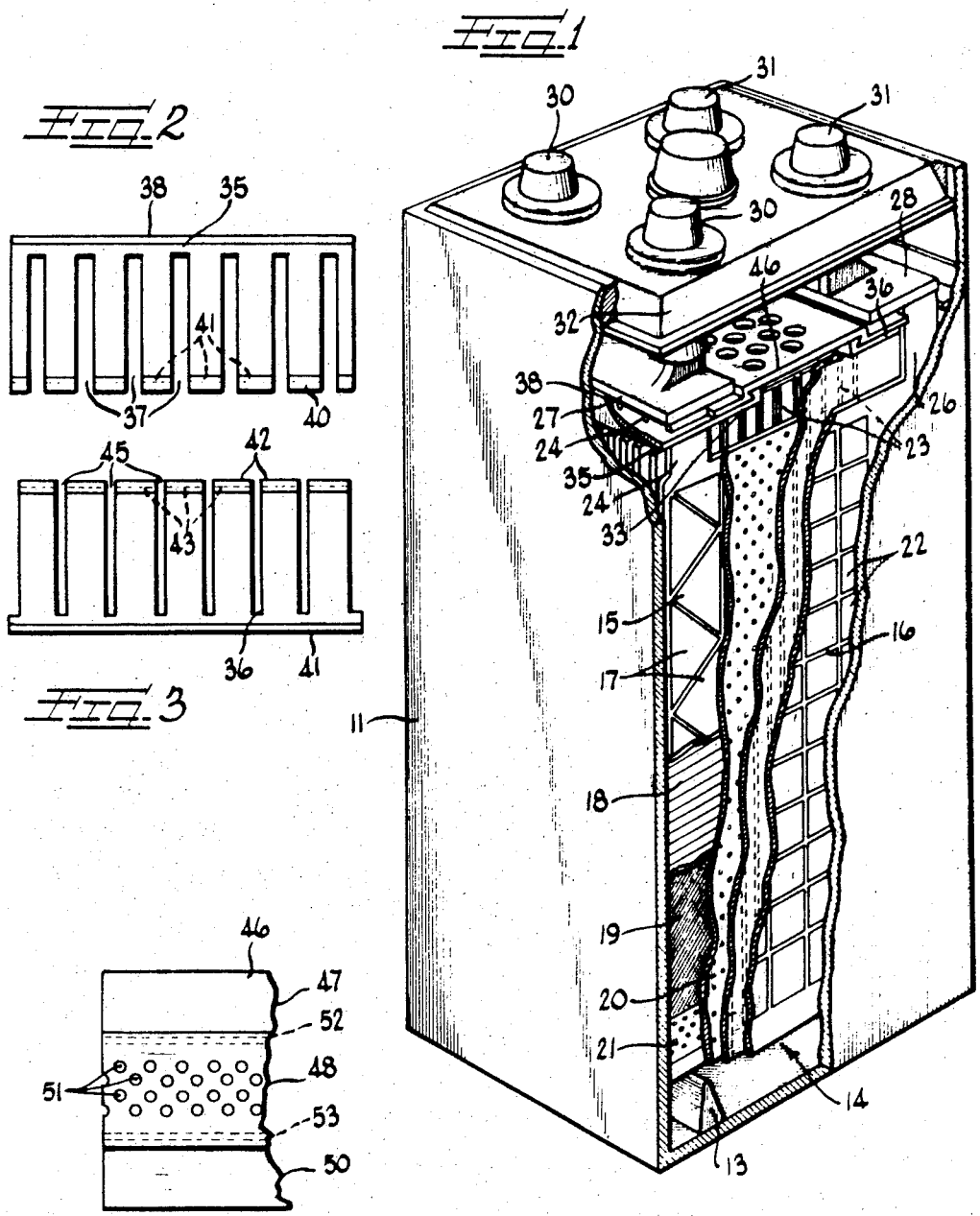
Inventors
Marion Ward Dickover
William N. Ritchie
Anderson, Luedeka, Fitch, Even, & Tabin
Attorneys 3,468,721
Patented Sept. 23, 1969

3,468,721
MOSS SHIELD AND SEPARATOR-
PROTECTOR ASSEMBLY
Marion Ward Dickover, Glenview, and William N.
Ritchie, Prospect Heights, Ill., assignors, by mesne
assignments, to KW Battery Company, Skokie, Ill.,
a corporation of Delaware
Filed Oct. 27, 1967, Ser. No. 678,667
Int. Cl. H01m 3/04
U.S. Cl. 136—181                        5 Claims

ABSTRACT OF THE DISCLOSURE

A moss shield and separator-protector assembly is described for use with storage batteries of the type including an element and two groups of lugs extending therefrom, such lugs being separately interconnected by electrically conductive straps. The moss shield and separator-protector assembly comprises a pair of moss shield sections, each having a plurality of slots extending from one edge to accommodate one of the groups of lugs, respectively. The assembly also comprises a separator-protector with a pair of imperforate side sections. The moss shield sections are secured to the separator-protector with the side sections of the separator-protector overlapping a portion of each of the moss shield sections at the slotted edges thereof to thereby provide a complete enclosure of the lugs.

---

This invention relates generally to storage batteries and, more particularly, to an improved storage battery and to a moss shield and separator-protector assembly for incorporation therein.

Storage batteries are generally comprised of one or more cells consisting of a plurality of interleaved positive and negative electrodes or plates disposed within an electrolyte in a jar or container. The interleaved plates are usually maintained in spaced relation by separators, which may be of any suitable material, such as wood or plastic or a combination of these or other materials. The assembly of interleaved plates and separators is referred to in the art as the element of the battery cell. Each positive and negative electrode or plate in the element is usually provided with a lug extending therefrom, and electrically conductive straps separately interconnect the positive group of lugs and interconnect the negative group of lugs.

Many storage batteries, particularly those of the lead-acid type used in vehicles, incorporate a moss shield and separator-protector assembly above each element in the storage battery container. This assembly is positioned between the upper portion of the battery cell element and the electrically conductive straps which interconnect the positive and negative lugs extending from the plates of the element. The moss shield and separator-protector assembly prevents shorts due to buildup of sediment on top of negative plates which would short the negative plates to the positive strap. Also, the assembly helps to confine the electrolyte, aids in preventing difficulties due to overfilling or overflow of electrolyte, helps to prevent foreign bodies from falling down between the various positive and negative plates in the element within the battery cell, and prevents thermometers and hydrometers from damaging the separators and plates.

Heretofore, it has usually been necessary that the moss shield and separator-protector assembly to provide 100 percent protection (i.e. completely surrounds the lugs) be manufactured of a heat-resistant material such as hard-rubber, at least in the region where the lugs pass upwardly through it. This is because the interconnecting straps between the lugs are usually secured to the lugs by welding or a similar process requiring high heat. Heat resistant material such as hard-rubber tends to be relatively expensive compared with non-heat-resistant materials, and is frequently brittle and therefore not readily shock-resistant. The latter factor also makes it difficult to punch such material for providing necessary openings. Moreover, when the moss shield and separator-protector assembly is put in place prior to securing the connector straps, final inspection of the connector strap welds and of the positive and negative plates and separators is more difficult because of the visual obstruction of the assembly. Also, the moss shield and separator-protector assembly is extremely difficult to remove to enable field repairs of the elements.

It is an object of this invention to provide an improved storage battery.

Another object of the invention is to provide a complete enclosure type moss shield and separator-protector assembly which may be manufactured out of a low-cost material and by a low-cost method.

A further object of the invention is to provide a complete enclosure type moss shield and separator-protector assembly which may be installed in a storage battery subsequent to installation of the connector straps for the lugs.

Another object of the invention is to provide a storage battery which is more readily manufactured, which is low in cost, which is easily inspected during manufacture and which is easy to repair in the field.

Other objects of the invention will become apparent to those skilled in the art from the following description taken in connection with the accompanying drawings wherein:

FIGURE 1 is a perspective view, with parts broken away, of a cell of a storage battery constructed in accordance with the invention;

FIGURE 2 is a top view of a positive moss shield section used in the battery cell of FIGURE 1;

FIGURE 3 is a top view of a negative moss shield section used in the battery cell of FIGURE 1; and FIGURE 4 is a top view of a separator-protector used in the battery cell of FIGURE 1.

Very generally, the invention comprises a moss shield and separator-protector assembly for storage batteries of the type including an element and two groups of lugs extending therefrom, such groups of lugs being separately interconnected by electrically conductive straps. The moss shield and separator-protector assembly comprises a first moss shield section having a plurality of slots extending from one edge thereof and spaced to accommodate the lugs in one group. A second moss shield section having a plurality of slots extending from one edge thereof is also provided. Such slots are spaced to accommodate the lugs in the other group. A separator-protector is provided having a pair of imperforate side sections. Securing means near the slotted edges of the first and second moss shield sections secure same to the separator-protector such that the side sections of the separator-protector overlap a portion of each of the moss shield sections at the slotted edges thereof, thereby completing the complete enclosure of the lugs of the plates.

Referring now to FIGURE 1, a particular embodiment of the invention may be seen. The illustrated structure is one cell of a multi-celled storage battery having an outer casing or container 11. The bottom of the container is provided with a plurality of ribs 13 which provide a support for an element 14 of the battery cell and also provides a space for sediment to collect without shorting out the element. The element 14 of the illustrated cell contains a plurality of positive plates, one of which is indicated at 15, and a plurality of negative plates, one of which is indicated at 16. The positive plate 15 is provided with a plurality of triangles 17 of active material such as lead dioxide. The positive plate 15 is wrapped with glass tape 18, and its bottom and surfaces are then covered with a glass mat 19. The plate 15 is then sealed in a plastic perforated envelope 20 and a bottom guard 21 is placed on the bottom of the plate. The negative plate 16 is provided with a plurality of rectangles 22 of an active material such as grey sponge lead. The plates 15 and 16 are positioned vertically in the cell and are spaced from each other by a plurality of separators 23. Each separator 23 consists of a microporous ribbed plastic sheet, but may also be comprised of porous sheets of any suitable insulator material such as plastic, rubber or wood.

Connector lugs 24 and 26 are provided at the tops of the positive and negative plates 15 and 16, respectively. The positive connector lugs 24 are arrayed in a linear row along one side of the cell and the negative connector lugs 26 are arrayed in a linear row along the opposite side of the cell from the lugs 24. The positive connector lugs 24 are electrically interconnected by an electrically conductive strap 27 suitably connected thereto as by welding or brazing. Similarly, the negative connector lugs 26 are electrically interconnected by an electrically conductive strap 28. Each of the straps 27 and 28 carries a pair of upwardly extending terminals 30 and 31, respectively. These terminals are brought out through a cover 32 of the storage battery container 11 for providing suitable external connection.

In welding, brazing, etc., the straps 27 and 28 to the respective set of lugs, considerable heat is generated. In order to avoid damage, therefore, a moss shield and separator-protector assembly indicated by the reference numeral 33, is not inserted in position until after the straps have been properly secured. The moss shield and separator-protector assembly 33 includes a positive moss shield section 35 and a negative moss shield section 36. The positive moss shield section 35 is illustrated in FIGURE 2 and comprises a generally rectangular piece of plastic having a plurality of slots 37 formed in one edge thereof for receiving the positive connector lugs 24. The slots 37 extend most of the way across the moss shield section 35 and the side opposite the slotted side of the moss shield section has an upwardly turned wall 38, the purpose of which will be described hereinafter. The slotted edge of the moss shield section 35 is provided with an upwardly extending portion 40 which has a V-shaped undercut 41 therein to form a dovetail type of securing means. The upwardly extending portion 40 has gaps at the slots 37. For low cost and reliability, the entire positive moss shield section is preferably made of a single integral piece of extruded plastic and the slots are subsequently formed therein by a suitable punch operation. However, the moss shield section may also be molded in its final shape.

Referring now to FIGURE 3, the negative moss shield section 36 is illustrated. The negative moss shield section 36 is of similar construction to the positive moss shield section 35 illustrated in FIGURE 2 and includes a generally rectangular piece of plastic having an integral upturned wall 41 on one side and an upwardly extending portion 42 on the other side. The portion 42 has a dovetail undercut 43 therein. Slots 45 are provided in one side of the moss shield section 36 at intervals corresponding to the spacing of the negative lugs 26.

The upturned walls 38 and 41 respectively act as a barrier which prevents shorting between the strap and the plate of opposite polarity. In some circumstances scaling or chips of lead peroxide form on the positive strap, post or lug and when these fall or scale off, these scales, if they contact the negative plate or strap can be converted into a conducting material (lead) and thereby create an electrical conducting path which will result in a short between the positive and negative portions of the element. The upturned walls 38 and 41 effectively restrict the movement of these scales and prevent their buildup on top of the plates along the container wall. It also prevents dendritic lead mossing from traveling from the negative strap to the top outside edges of the positive plates by effectively lengthening the path between these two components of the element.

Referring now to FIGURE 4, a separator-protector 46 may be seen. The separator-protector also preferably consists of a unitary piece of plastic, and is formed in three elongated parallel sections 47, 48 and 50. The two side sections 47 and 50 are imperforate, whereas a plurality of holes 51 are punched out of the central section 48 to render the latter section perforate. On the underside of the separator-protector 46 along the juncture between the side section 47 and the central section 48, a dovetail projection 52 is formed. A similar dovetail projection 53 is formed along the juncture between the side section 50 and the center section 48. The spacing of these dovetail projections 52 and 53 corresponds to the spacing of the dovetail notches 41 and 43, respectively, in the negative and positive moss shield sections when the latter are in position. The imperforate side sections 47 and 50 overlap a portion of each of the moss shield sections, covering the open region at the slots 37 and 45. This provides an imperforate barrier completely surrounding the positive and negative lugs 24 and 26 when the moss shield sections 35 and 36 and the separator protector 46 are in position.

As a result of the foregoing construction, the moss shield and separator-protector assembly 33 may be assembled after securing the straps 27 and 28 to the lugs 24 and 26. Assembly is accomplished by first inserting the positive and negative moss shield sections 35 and 36 from outside to inside of the respective rows of lugs, pushing them away from the respective sides of the battery so that the lugs pass into the slots. The separator-protector 46 is then positioned by either snapping the interlocking dovetail portions into the notches 41 and 43 or by sliding the separator-protector in from the end after aligning and mating the interlocking dovetail portions.

Because the moss shield and separator-protector assembly 33 is not subjected to a high degree of heat from any welding or brazing operations, it may be manufactured entirely out of a low cost and easily manufactured extruded plastic, such as polyethylene, polypropylene, vinyl chloride, etc. The slots and holes may be easily formed therein by a suitable punch operation. Alternately, the moss shield and separator-protector assembly may be molded in its final shape. Moreover, plastic of the foregoing types is generally shock resistant and is therefore less easily broken than the hard-rubber moss shield and separator-protector assemblies heretofore in common use for complete enclosure. Finally, since installation of the moss shield and separator-protector assembly is unnecessary until after assembly of the complete cell element, the element is more easily inspected in the underpart thereof for such defects as lead rundowns and broken separators.

It may therefore be seen that the invention provides an improved storage battery and a unique moss shield and separator-protector assembly therefor. The latter is readily manufactured and installed, facilitates final inspection of the battery, and provides for lower material and manufacturing costs.

Various modifications of the invention will be apparent to those skilled in the art from the foregoing description and accompanying drawings. Such other modifications are intended to fall within the scope of the appended claims.

What is claimed is:

1. A moss shield and separator-protector assembly for storage batteries of the type including an element and two groups of lugs extending therefrom, such lugs being separately interconnected by electrically conductive straps, said moss shield and separator-protector assembly comprising, a first moss shield section having a plurality of slots extending from one edge thereof and spaced to accommodate the lugs in one group, a second moss shield section having a plurality of slots extending from one edge thereof and spaced to accommodate the lugs in the other group, first and second securing means proximate said slotted edges of said first and second moss shield sections, respectively, a separator-protector having a pair of imperforate side sections, and third and fourth securing means engageable with said first and second securing means, respectively, to secure said separator-protector between said first and second moss shield sections and with said side sections of said separator-protector overlapping a portion of each of said moss shield sections at said slotted edges thereof to thereby provide a complete enclosure of the lugs.

2. A moss shield and separator-protector assembly according to claim 1 wherein said first, second, third and fourth securing means each comprise integral dovetailing means.

3. A moss shield and separator-protector assembly according to claim 1 wherein said separator-protector includes a perforate central section positioned between said side sections, and wherein said third and fourth securing means are positioned, respectively, at the junctures between said central section and said side sections.

4. A moss shield and separator-protector assembly according to claim 1 wherein said moss shield and separator-protector are comprised of plastic.

5. A storage battery comprising an element including a plurality of interleaved positive and negative plates having lugs extending therefrom, a positive strap and a negative strap each interconnecting, respectively, the lugs extending from said positive and negative plates, a positive moss shield section positioned between said element and said positive strap and having a plurality of slots extending from one edge thereof for accommodating the lugs extending from said positive plates, a negative moss shield section positioned between said plate and said negative strap and having a plurality of slots extending from one edge thereof for accommodating the lugs extending from said negative plates, said positive and negative moss shield sections having dovetail projections extending therefrom along the slotted edges thereof, a separator-protector having a pair of imperforate side sections and a perforate central section positioned therebetween, said separator-protector having a pair of dovetail projections extending therefrom at the junctures between said central section and said side sections, said dovetail projections on said separator-protector being interengaged with said dovetail projections on said positive and negative moss shield sections to secure said separator-protector between said moss shield sections, said side sections of said separator-protector overlapping a portion of each of said positive and negative moss shield sections at said slotted edges thereof and extending to said lugs to form an imperforate barrier surrounding each of said lugs.

References Cited
UNITED STATES PATENTS

| | | | |
|---|---|---|---|
| 1,262,581 | 4/1918 | Gardiner | 136—168.2 |
| 1,322,102 | 11/1919 | Gardiner | 136—163.5 |
| 2,702,829 | 2/1955 | Chapel | 136—168 |

WINSTON A. DOUGLAS, Primary Examiner

D. L. WALTON, Assistant Examiner

U.S. Cl. X.R.

136—163, 170